Figure 1:
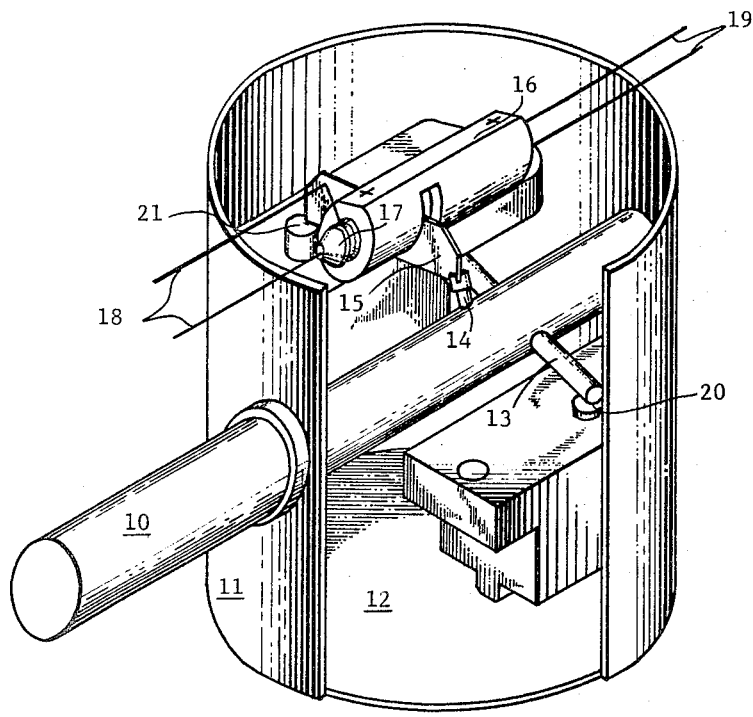

May 14, 1968     J. G. COPLAND ET AL     3,383,518
LIGHT SHUTTER AND SUPPORT ROD OPERATING SWITCHES
AT LIMITS OF SHUTTER MOVEMENT

Filed June 28, 1965     2 Sheets-Sheet 1

INVENTORS
JAMES G. COPLAND
EDWARD J. THOR
BY
John B. Sponsler

May 14, 1968   J. G. COPLAND ET AL   3,383,518
LIGHT SHUTTER AND SUPPORT ROD OPERATING SWITCHES
AT LIMITS OF SHUTTER MOVEMENT
Filed June 28, 1965   2 Sheets-Sheet 2

INVENTORS
JAMES G. COPLAND
EDWARD J. THOR
BY
John B. Sponsler

United States Patent Office 3,383,518
Patented May 14, 1968

3,383,518
LIGHT SHUTTER AND SUPPORT ROD OPERATING SWITCHES AT LIMITS OF SHUTTER MOVEMENT
James G. Copland and Edward J. Thor, Roanoke, Va., assignors to General Electric Company, a corporation of New York
Filed June 28, 1965, Ser. No. 467,232
2 Claims. (Cl. 250—231)

This invention relates to control devices utilized in battery powered, direct current motor driven, vehicles, and is more particularly concerned with controlling the speed and operation of such equipment by way of utilizing characteristics of light sensitive materials wherein a variable resistance function is obtained in a control circuit.

The subject invention is related to copending application Ser. No. 466,240, filed June 23, 1965, in which is described and claimed an embodiment of what may be classified as a light controlled potentiometer, which indirectly forms a part of the subject matter of this invention.

Normally battery powered vehicles such as warehouse trucks, forklift trucks, so-called "electric golf carts" and the like are provided with direct current, series motor drives powered by storage batteries carried in the vehicle. Variable speed control is a primary requirement in vehicles of these types, and the usual speed controls are provided by the inclusion of potentiometers, rheostats or multi-contact resistors. In another copending application Ser. No. 437,532, filed Mar. 5, 1965, a circuit is described wherein a silicon controlled rectifier under control of a rheostat is used to carry the main energizing current for the motors propelling such vehicles.

The battery powered vehicles generally are operated and controlled by hand or foot throttles actuating slider operated rheostats or potentiometers, which are subject to rugged usage and almost continuous operation resulting in failures due to wear, dirt and contact voids, resulting in not only frequent requirement for replacements, but also safety impairments.

It is an object of this invention to provide for electric battery operated vehicles a manual control device having great durability and reliability.

Another object of the invention is the provision of a speed control device for an electric motor having inappreciable wear of the elements providing the speed variation.

Still another object of the invention is to provide a speed control for an electric motor making use of the variable resistance characteristic of a light sensitive material under control of a variable light source.

The invention is set forth with particularity in the appended claims. The principles and characteristics of the invention, as well as other objects and advantages are revealed and discussed through the medium of the illustrative embodiments appearing in the specification and drawings which follow.

Figure 2:
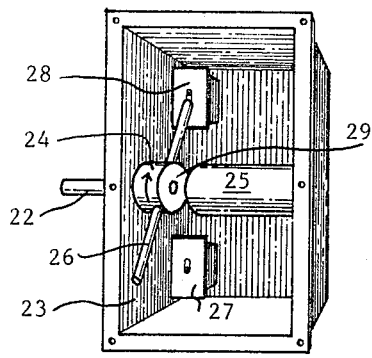
Figure 3:
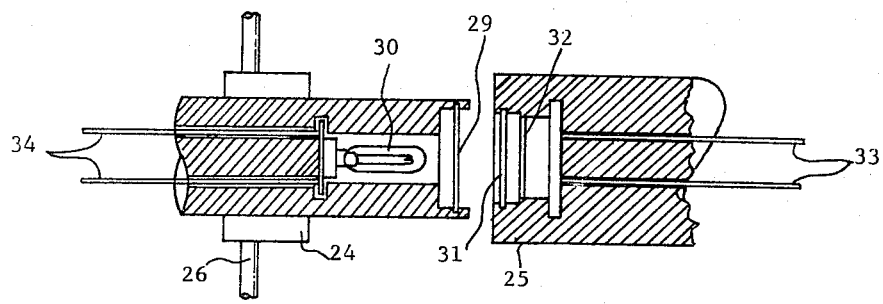
Figure 4:
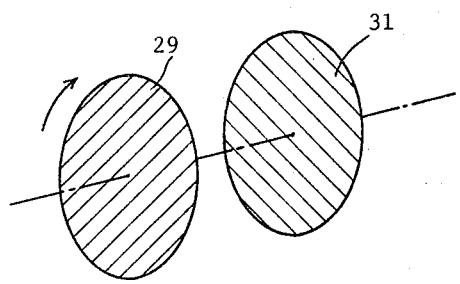

In the drawings:
FIGURE 1 illustrates a cutaway perspective of the invention in one embodiment.
FIGURE 2 illustrates another embodiment of the invention similar in all respects except one to that shown by FIGURE 1.
FIGURE 3 is a diagrammatic detailed view of part of the structure of FIGURE 2 showing its distinction over the structure of FIGURE 1.
FIGURE 4 is a detail in diagram of part of the structure of FIGURE 3.

Referring to FIGURE 1 a shaft 10 is mounted to rotate in a cylindrical enclosure 11 having a base 12. Attached to and projected through the shaft 10 is a rod 13, the shaft 10 also carrying another projecting element 14 to which is attached a shutter 15. Coacting with the shutter 15 is a hollow capsule 16 having a slotted portion into which the shutter 15 moves as the shaft 10 is rotated. At one end of the capsule 16 is a lamp 17 and in the other end of the capsule 16 is a light sensitive element (not shown) having leads 19 extending from it. The light sensitive element may be a disc of cadmium sulphide or similar material to which the leads 19 are attached in a conventional manner whereby the resistance of the material under varying intensities of light is represented.

The operation of the device shown in FIGURE 1 provides a varying electrical resistance at the output of the leads 19 as the shaft 10 is rotated when a voltage is applied via leads 18 to illuminate the lamp 17, the shutter 15 regulating the amount of light transmitted between the lamp 17 and the light sensitive element in the other end of the capsule 16. The voltage supply to the lamp 17 should be regulated at a constant value, if the calibration of the device in respect to the position of shaft 10 is to be accurate. In the operation of battery powdered trucks and the like, however, it is unnecessary to regulate the voltage supply to the lamp 17, keeping it relatively constant being sufficient.

The rod 13 carried by the shaft 10 is for the purpose of operating a limit switch 20, which is connected in series with one of the leads 19 so that at the minimum intensity of light to the light sensitive element the resistance of the combination becomes infinite, corresponding to an "off" position. Similarly a limit switch 21 may be provided to be operated by the shutter 15, when the maximum intensity of light is provided to the light sensitive element due to the rotation of the shaft 10 to its other extreme, connected in parallel with the leads 19, corresponding to a fully "on" position. These limit switches remove the control of the circuit output of the leads 19 from the normally active light sensitive element at both minimum and maximum values of resistance so that "on" and "off" operation may be had when required without the normal light regulated control function.

FIGURES 2, 3 and 4 illustrate a further embodiment of the device wherein a shaft 22, mounted to rotate within a housing 23, carries a cylinder 24 and a rod 26 fitted to turn with the shaft. Within the housing 23 there is mounted a cylindrical member 25 facing the cylinder 24, the former containing a light sensitive element 32 and the latter containing a light source 30, arranged so that light from the source 30 is transmitted to the element 32. The light source 30 is energized via its leads 34 and the output of the element 32, similar to that of the element described in connection with FIGURE 1, is provided by the leads 33. Polarized filters 29 and 31 respectively are provided between the light source 30 and the light sensitive element 32 for varying the amount of light transmitted therebetween when the shaft 22 is rotated. As a consequence the leads 33 provide an output of the element 32 having a variable resistance, which may be substituted, by way of example, for the variable resistor 40 shown in the drawing of the aforementioned application Ser. No. 437,532 to provide a more sophisticated control. Limit switches 27 and 28, respectively, provide minimum and maximum controls in cooperation with the rod 26 in a manner similar to that previously described in respect to FIGURE 1.

While the invention has been explained and described with the aid of particular embodiments thereof, it will be understood that the invention is not limited thereby and that many modifications retaining and utilizing the spirit thereof without departing essentially therefrom will occur to those skilled in the art in applying the invention to specific operating environments and conditions. It is there-

What is claimed is:

1. A control device having a variable resistance output comprising a light sensitive element having a resistance proportional to the quantity of light received, a light source arranged to illuminate the said element, said source and said element being encapsulated in a common container, a slot in said container intermediate of said source and said element, a shutter arranged to operate within said slot to control the amount of light from said source to said element, a control member for operating said shutter between predetermined limits, and means under control of said member at said limits for disrupting the output of said variable resistance output.

2. A control device having a variable resistance output including a light sensitive element having a resistance proportional to the quantity of light received, a light source, a tubular container enclosing said source and said element in juxtaposition, a slot in said container intermediate said element and said source, a shutter operable to enter said slot to control the amount of light from said source to said element, a control member for varying the depth of entrance of said shutter into said slot for changing the amount of light from said source to said element, and means for disrupting the output of said device actuated when the said shutter is fully entered or fully withdrawn.

References Cited

UNITED STATES PATENTS

| | | | |
|---|---|---|---|
| 2,442,145 | 5/1948 | Ray | 250—231 X |
| 3,197,783 | 7/1965 | Byong-Ho Ahn et al. | 250—237 X |

ROBERT SEGAL, *Primary Examiner.*